United States Patent
Yu et al.

(10) Patent No.: US 12,540,478 B2
(45) Date of Patent: Feb. 3, 2026

(54) FLEXIBLE GLASS PROTECTIVE NET WITH LANDSCAPE FUNCTION FOR FALLING OBJECTS AND DESIGN METHOD THEREOF

(71) Applicants: Southwest Jiaotong University, Chengdu (CN); China Construction Fifth Engineering Bureau Southwest Construction & investment Co., Ltd., Chengdu (CN); Sichuan Provincial Architectural Design And Research Institute Co., Ltd, Chengdu (CN)

(72) Inventors: Zhixiang Yu, Chengdu (CN); Lijun Zhang, Chengdu (CN); Shixing Zhao, Chengdu (CN); Huan He, Chengdu (CN); Hu Xu, Chengdu (CN); Shichun Zhao, Chengdu (CN)

(73) Assignees: Southwest Jiaotong University, Chengdu (CN); China Construction Fifth Engineering Bureau Southwest Construction & investment Co., Ltd., Chengdu (CN); Sichuan Provincial Architectural Design And Research Insitute Co., Ltd, Chengdu (CN)

( * ) Notice: Subject to any disclaimer, the term of this patent is extended or adjusted under 35 U.S.C. 154(b) by 1091 days.

(21) Appl. No.: 17/485,542

(22) Filed: Sep. 27, 2021

(65) Prior Publication Data
US 2022/0333393 A1 Oct. 20, 2022

(30) Foreign Application Priority Data

Apr. 19, 2021 (CN) .......................... 202110415567.5

(51) Int. Cl.
*E04G 21/32* (2006.01)
*E01F 7/04* (2006.01)

(52) U.S. Cl.
CPC .......... *E04G 21/3266* (2013.01); *E01F 7/045* (2013.01)

(58) Field of Classification Search
CPC ........ E02D 17/202; E01F 7/045; E04D 13/03; E04D 13/05; E04D 13/0335; E04G 21/3266; E04B 7/24
(Continued)

(56) References Cited

U.S. PATENT DOCUMENTS 3,762,110 A * 10/1973 Boss, Jr. ............... E04G 21/242
 52/63
4,875,549 A * 10/1989 Denny ................ E04G 21/3266
 182/138
(Continued)

*Primary Examiner* — Paola Agudelo
(74) *Attorney, Agent, or Firm* — Bayramoglu Law Offices LLC

(57) ABSTRACT

A flexible glass protective net with landscape function for falling objects and a design method thereof includes flexible support ropes, buckling clamps, articulated pieces, glass plates and seam rubber strips; the flexible support ropes are arranged crosswise in a grid shape, the buckling clamps are arranged at grid nodes, and the glass plates are arranged in the grids; the glass plate includes pieces of glass, and the pieces of glass are connected by the seam rubber strips at seams; the glass is clamped and fixed by the articulated piece, the tail end of the articulated piece is connected to the buckling clamp, and the glass plate is connected to the buckling clamp via the articulated piece; mutually crossing and separated slots are reserved in the buckling clamps, and the flexible support ropes at the grid nodes respectively pass through the slots.

9 Claims, 5 Drawing Sheets

(58) Field of Classification Search
USPC .......................................................... 52/83
See application file for complete search history.

(56) References Cited

U.S. PATENT DOCUMENTS

| | | | | |
|---|---|---|---|---|
| 7,481,235 B2* | 1/2009 | Prusmack | ............... | E04H 15/18 135/147 |
| 7,752,820 B2* | 7/2010 | Deschamps | ............... | E01C 9/08 52/222 |
| 9,212,489 B1* | 12/2015 | Erickson | ............. | E04D 13/0335 |
| 9,441,378 B1* | 9/2016 | Conklin | ............... | E04D 13/0315 |
| 2009/0044459 A1* | 2/2009 | Kolozsvary-Kiss | ...... | E04B 7/14 52/63 |
| 2010/0223859 A1* | 9/2010 | Stackenwalt | ......... | E04B 9/0414 52/83 |
| 2011/0067966 A1* | 3/2011 | Von Allmen | ............ | F16G 11/12 188/371 |
| 2014/0339018 A1* | 11/2014 | Blinn | .................. | E04G 21/3223 182/82 |
| 2015/0033655 A1* | 2/2015 | Kromer | .................... | E04C 5/073 52/425 |
| 2015/0211818 A1* | 7/2015 | Krell | ....................... | F28F 25/082 29/890.035 |
| 2016/0177067 A1* | 6/2016 | Agosta | ...................... | C08L 3/02 106/126.3 |
| 2019/0383015 A1* | 12/2019 | Wendeler-Goeggelmann ............. B21F 5/00 |
| 2020/0308785 A1* | 10/2020 | Sennhauser | ............. | E01F 7/04 |
| 2020/0331232 A1* | 10/2020 | Wheeler | ............. | E04G 21/3266 |
| 2020/0370252 A1* | 11/2020 | Journeaux | ............... | E01F 7/045 |
| 2021/0396019 A1* | 12/2021 | Schlaich | ................. | E04B 2/885 |
| 2022/0220679 A1* | 7/2022 | Yu | ............................. | E01F 7/04 |
| 2023/0043490 A1* | 2/2023 | Sennhauser | ........... | F16G 11/046 |

\* cited by examiner

FLEXIBLE GLASS PROTECTIVE NET WITH LANDSCAPE FUNCTION FOR FALLING OBJECTS AND DESIGN METHOD THEREOF

CROSS REFERENCE TO THE RELATED APPLICATIONS

This application is based upon and claims priority to Chinese Patent Application No. 202110415567.5, filed on Apr. 19, 2021, the entire contents of which are incorporated herein by reference.

TECHNICAL FIELD

The present invention relates to the technical field of falling object protection, in particular to a flexible glass protective net with landscape function for falling objects and a design method thereof.

BACKGROUND

City high-altitude falling objects relate to a situation that shelves or suspensions thereof fall off or fall from buildings, structures or other facilities. High-altitude thrown objects refer to falling objects thrown from buildings. Falling objects occur with low probability and randomness. Falling objects are generally small and light, have low impact speed, and are usually fruit peels, paper scraps, external wall tiles, external units of air conditioners. In recent years, reports about casualties caused by falling objects are not rare. The falling objects are one of the safety issues that China pays great attention. Although China's laws and regulations have detailed falling objects, the current research on protection technology for such falling objects is limited.

In urban space, the concept of "beautify the city" is emphasized, the requirements for urban landscape design are increased, and the overall images of buildings and structures need to be coordinated and unified. Therefore, falling object protection systems need to pay attention to appearance design. Although the impact energy of falling objects is generally low, falling events of large electrical appliances such as external units of air conditioners still occur, so the impact resistance of protection systems should also be improved. In addition, there are many vehicles and people on urban roads. Large-area excavation and construction are prone to traffic jams to affect the passage of people and vehicles.

In view of this, the patented technology proposes a flexible glass net protection system considering landscape function, impact resistance and convenient construction.

SUMMARY

In order to solve the problems in the prior art, the present invention provides a flexible glass net protective system with landscape function for falling objects, which is easy to construct and is used to block city high-altitude falling objects and thrown objects, and a design method thereof.

In order to achieve the above objectives, the technical solutions adopted by the present invention are as follows:

A flexible glass protective net with landscape function for falling objects includes flexible support ropes, buckling clamps, articulated pieces, glass plates and seam rubber strips;

The flexible support ropes are arranged crosswise in a grid shape, the buckling clamps are arranged at grid nodes, and the glass plates are arranged in the grids;

The glass plate includes pieces of glass, and the pieces of glass are connected by the seam rubber strips at seams;

The glass is clamped and fixed by the articulated piece, the tail end of the articulated piece is connected to the buckling clamp, and the glass plate is connected to the buckling clamp via the articulated piece;

Mutually crossing and separated slots are reserved in the buckling clamps, and the flexible support ropes at the grid nodes respectively pass through the slots.

Further, the flexible glass protective net includes stiffening slats, the stiffening slats are arranged at the seams of the glass and located on the bottom surface of the glass plates, the stiffening slat is provided with a long circular bolt hole and connected to the glass plate by a first pre-tightening bolt, and the stiffening slats at opposite positions are connected by a steel wire or a spring.

Further, the buckling clamp includes a clamping plate and second pre-tightening bolts; the slots are reserved in the clamping plate, edges of the clamping plate are provided with reserved holes, and the articulated piece is connected to the reserved holes by bolts.

Further, the flexible glass protective net includes rubber pads, and the rubber pads are arranged at the joints between the articulated pieces and the glass plates.

Further, the stiffening slats are energy-consuming stiffening slats.

Further, the glass plate is tempered glass, and the glass plate is rhombic and is spliced by four pieces of glass.

On the other hand, the present application further protects a design method of a glass plate system for the flexible glass protective net with landscape function for falling objects according to one of the foregoing, the glass plate system including glass plates and stiffening slats;

Specific steps are as follows:

(a) Designing the Area and Thickness of the Glass Plates;

First, setting the area and thickness of the glass plates based on experience, and then calculating a strength design value $f_g$ as follows:

$$f_g = c_1 c_2 c_3 c_4 f_0$$

In the formula, $c_1$ is a glass type coefficient, $c_2$ is a glass strength position coefficient; $c_3$ is a load type coefficient; $c_4$ is a glass thickness coefficient; $f_0$ is a central strength design value of the plate glass under short-term load, which is 28 MPa;

When the system is working, it is assumed that the laminated glass is not broken when the seam rubber strip is broken; if the impact force is located in the center of the glass plate, the maximum bending moment $M_{max}$ borne by the glass plate at the moment is:

$$M_{max} = W[\sigma]$$

In the formula, W is a section modulus at the maximum bending moment of the seam rubber strip, and $[\sigma]$ is an ultimate strength of the seam rubber strip;

At this time, the maximum tensile stress $\sigma_{max}$ of the glass plate is:

$$\sigma_{max} = \frac{M_{max}}{W_g}$$

$$W_g = \frac{ut^2}{6}$$

In the formula, $M_{max}$ is the maximum bending moment when the glass plate is subjected to an impact force, $W_g$ is the section modulus at the maximum bending moment of the glass plate, u is the length of the section at, the maximum bending moment, and t is the thickness of the laminated glass;

If the maximum stress $\sigma_{max}$ of the glass plate satisfies the following condition:

$\sigma_{max} \leq f_g$

Then the area and thickness of the glass plate set based on experience are taken as design values.

Further, the design method includes:
(b) Designing Circular Holes of Glass

The hole diameter of the laminated glass should satisfy the following condition:

$d \geq t_1$

In the formula, $t_1$ is the thickness of the tempered glass; d is the diameter of circular holes of glass;

The distance a between the edge of the circular hole of the glass and the edge of the glass should satisfy:

$a \geq 2t_1$

The distance b between the edges of two circular holes of the glass should satisfy:

$b \geq 2t_1$

The distance c between the edge of the circular hole of the glass and the corner of the glass should satisfy:

$c \geq 6t_1$

Further, the design method includes:
(c) Determining Ultimate Deformation $\Delta l$ of the Seam Rubber Strip;

The design width l of the seam rubber strip is calculated according to the following formula:

$$l = \frac{q_G A}{2000 \cdot sf_2}$$

In the formula, $q_g$ is a gravity load design value of a single piece of laminated glass per unit area; s is a length sum of the single piece of laminated glass connected with the seam rubber strip; $f_2$ is a strength design value of a sealant under load, which is 0.1 N/mm²;

Under the action of impact, the seam rubber strip deforms, and its deformation amount is:

$\Delta l = \varepsilon \cdot l$

In the formula, $\varepsilon$ is an ultimate strain.
Further, the design method includes:
(d) Designing Bolt Pre-Tightening Force N of Stiffening Slats;

The seam rubber strip is broken under force, the stiffening slat is started under force, and the internal force F of the steel wire connecting the stiffening slats is:

$$F = \frac{\Delta l}{l_s} E_s A_s$$

$F < [f] A_s$

In the formula, $l_s$ is a length of the steel wire, $E_s$ is an elastic modulus of the steel wire, $A_s$ is a cross-sectional area of the steel wire, and [f] is a yield strength of the steel wire.

The bolt pre-tightening force N is:

$$N > \frac{F}{2\mu}$$

In the formula, $\mu$ is a friction coefficient;

The length L of the long circular hole of the stiffening slat is designed; the energy consumption starting force $F_d$ of the stiffening slat is calculated as follows:

$F_d = 2\mu N$

The length L of the long circular hole of the stiffening slat is calculated as follows:

$$L = \frac{E}{F_d}$$

In the formula: E is energy consumption capacity of the stiffening slat.

Compared with the prior art, the present invention has the following advantages:

(1) A flexible glass net protective system with landscape function for falling objects according to the present invention has graded protection capability for falling objects, which is specifically embodied as: under low kinetic energy impact of falling objects, the falling objects are intercepted and blocked by the glass plates in the support rope grids, wherein the glass plates work independently to completely block the falling objects; and under high kinetic energy impact of falling objects, the glass plates transfer the impact force to the bottom supporting energy-consuming stiffening slats, and the stiffening slats are stretched to slip relative to the connecting bolts at the long circular holes, which realizes frictional energy consumption and buffer protection of the glass plates.

(2) The structural design adopts laminated glass, which considers the landscape performance, the structure is easy to construct and install, and the energy consumption of the system is independent. If a single glass plate is broken, only one plate is replaced without replacing the entire system.

In general, the present invention is skillful in design and convenient to construct and install, has broad market prospects, and is suitable for popularization and use.

BRIEF DESCRIPTION OF THE DRAWINGS

In order to describe the technical solutions in the embodiments of the present invention or in the prior art more clearly, the following briefly introduces the accompanying drawings required in the description of the embodiments or the prior art. Apparently, the accompanying drawings in the following description show some embodiments of the present invention, and those of ordinary skill in the art may still derive other drawings from these accompanying drawings without any creative effort.

In the above figures, the names of parts corresponding to reference signs are as follows:

1—flexible support rope;
2—buckling clamp;
3—articulated piece;
4—glass plate;
5—stiffening slat;
6—laminated glass;
7—bolt;
8—seam rubber strip;
9—first pre-tightening bolt;
9'—second pre-tightening bolt;
10—rubber pad;
11—clamping plate;
12—slot.

DETAILED DESCRIPTION OF THE EMBODIMENTS

In order to make the objectives, technical solutions and advantages of the present invention clearer, the following clearly and completely describes the technical solutions in the embodiments of the present invention with reference to the drawings in the embodiments of the present invention. Apparently, the described embodiments are only part of the embodiments of the present invention, not all of them. All other embodiments obtained by those ordinary technicians in the field based on the embodiments of the present invention without any inventive effort shall fall within the scope of protection of the present invention.

Figure 1:
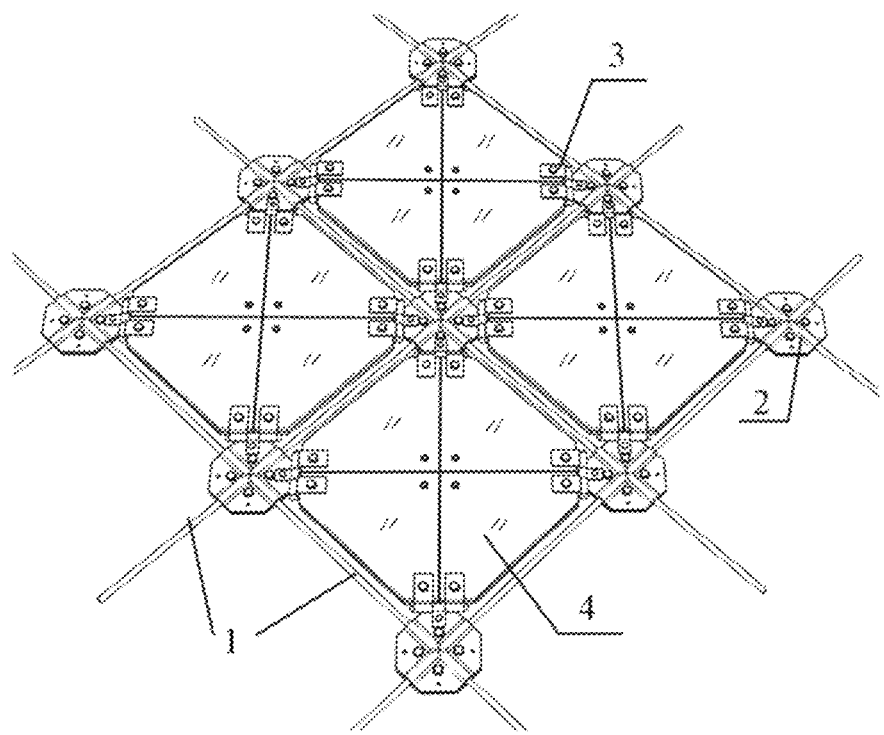
FIG. 1 is a top view of a flexible glass protective net with landscape function for falling objects according to an embodiment of the present invention.
Figure 2:
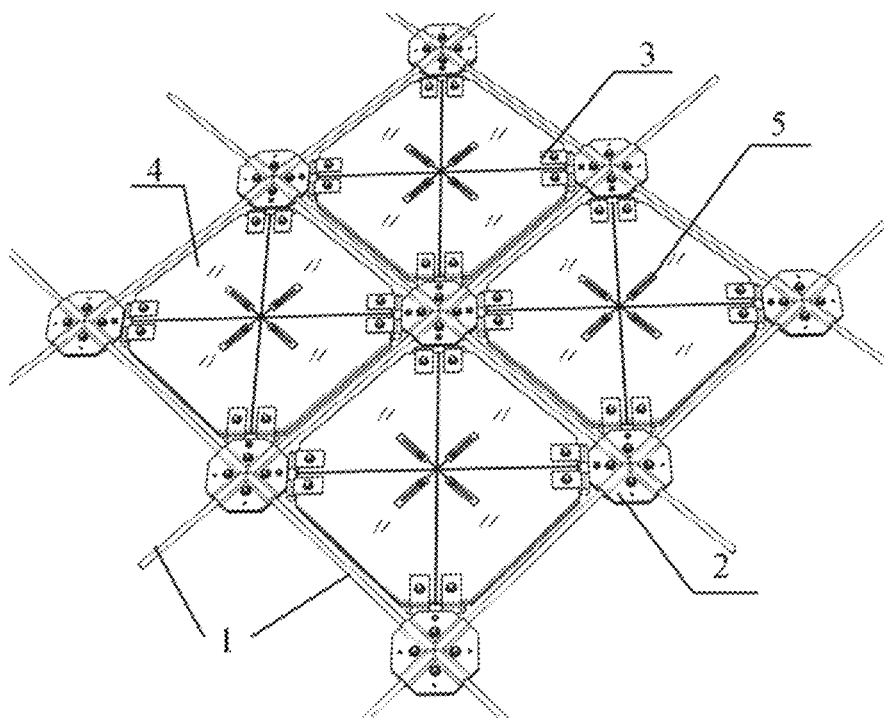
FIG. 2 is a bottom view of the flexible glass protective net with landscape function for falling objects according to an embodiment of the present invention.
Figure 3:
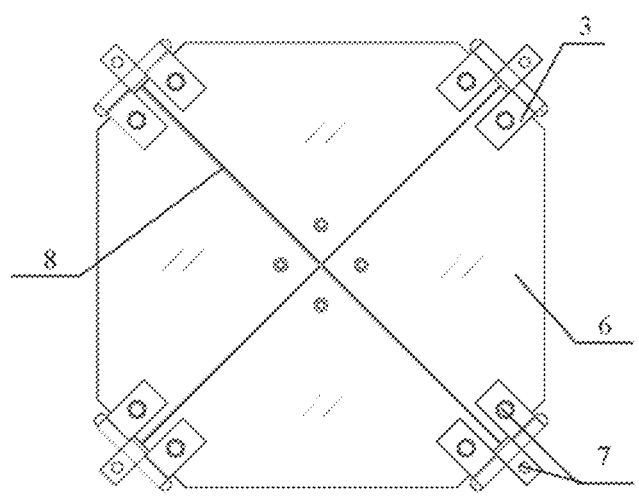
FIG. 3 is a top view of a glass plate of the flexible glass protective net with landscape function for falling objects according to an embodiment of the present invention.
Figure 4:
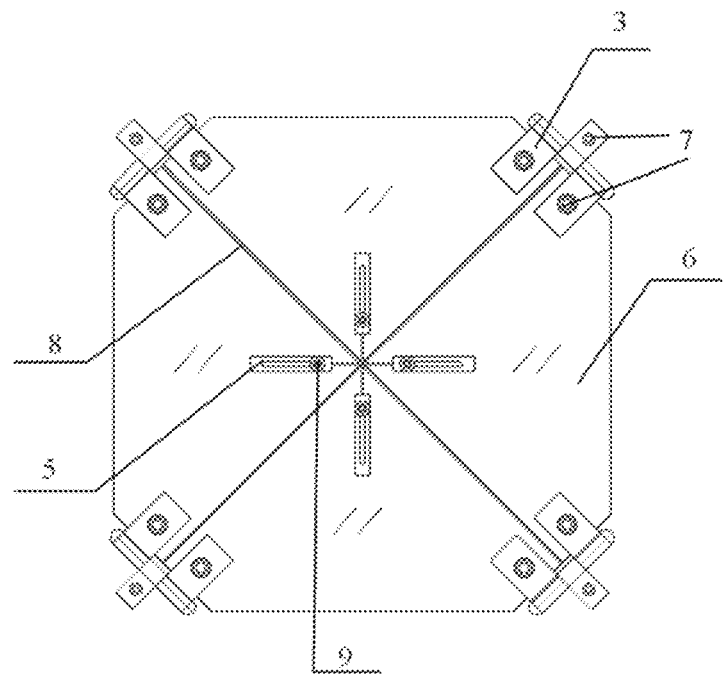
FIG. 4 is a bottom view of the glass plate of the flexible glass protective net with landscape function for falling objects according to an embodiment of the present invention.
Figure 5:
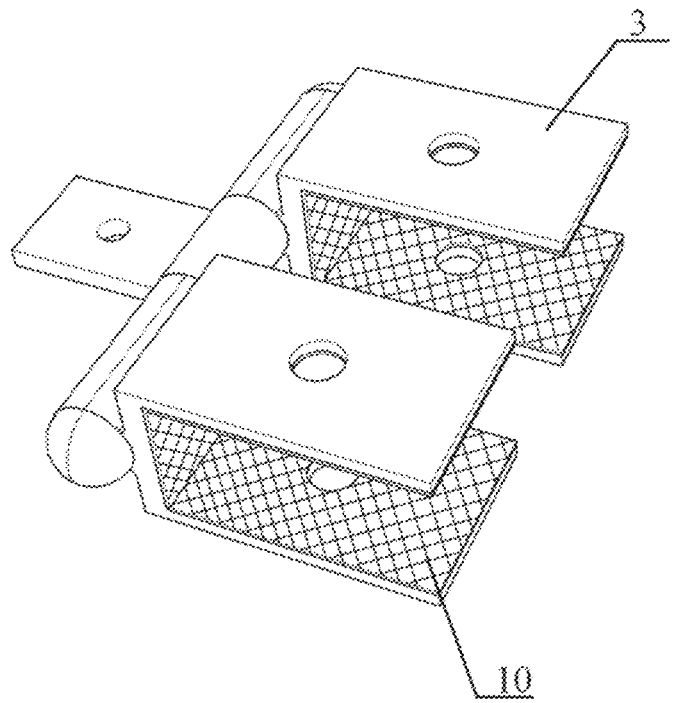
FIG. 5 is a schematic diagram of an articulated piece of the flexible glass protective net with landscape function for falling objects according to an embodiment of the present invention.
Figure 6:
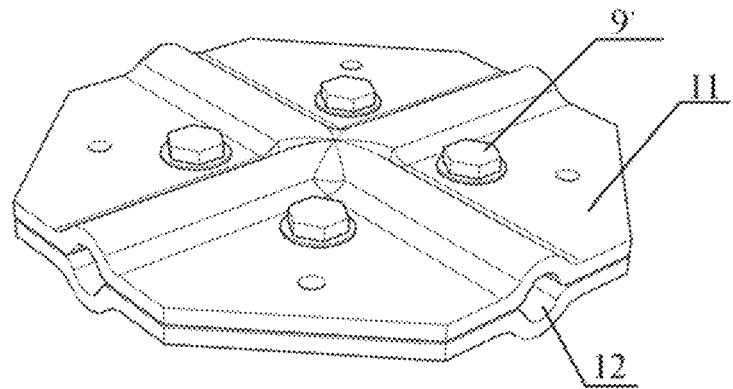
FIG. 6 is a schematic diagram of a clamp of the flexible glass protective net with landscape function for falling objects according to an embodiment of the present invention.

As shown in FIGS. 1-6, in the embodiment of the present application, the flexible glass protective net with landscape function for falling objects includes the flexible support ropes 1, the buckling clamps 2, the articulated pieces 3, the glass plates 4 and the seam rubber strips 8; the flexible support ropes 1 are arranged crosswise to form geometric grids, and grid intersections are clamped by the buckling clamps 2; the buckling clamp 2 is composed of the clamping plate 11 and the second pre-tightening bolts 9', the slots 12 are reserved in the clamping plate 11, edges of the buckling clamp 2 are provided with holes, and the buckling clamp 2 is connected to the articulated piece 3 by the bolts 7; Preferably, the articulated piece 3 may be a hinge; and the rubber pad 10 is arranged at the joint between the articulated piece 3 and the glass plate 4. Preferably, the glass plate 4 may be the tempered glass; the glass plate 4 includes the laminated glass 6 and the seam rubber strips 8, that is, the glass plate 4 in the grid is spliced by pieces of the laminated glass 6, the pieces of laminated glass 6 are connected by the seam rubber strips 8 at seams, the stiffening slats 5 are arranged on the bottom surface of the glass plate 4, and the glass plate 4 is connected to the buckling clamp 2 by the articulated piece 3.

In the embodiment of the present application, the flexible glass protective net with landscape function for falling objects further includes the stiffening slats 5, the stiffening slats 5 are arranged at intersection of seams, and the rubber pads 10 are arranged at the contact parts with the glass. The stiffening slat 5 is provided with the long circular bolt hole and connected to the glass plate 4 by the first pre-tightening bolt 9, the opposite stiffening slats 5 are connected by the steel wire or the spring, and the pre-tightening force of the first pre-tightening bolt 9 needs to be designed and calculated, and should not affect the stiffening slat 5 to produce slip friction. Further, the stiffening slats 5 are energy-consuming stiffening slats according to protection requirements. Under low kinetic energy impact of falling objects, the falling objects are intercepted and blocked by the glass plates in the support rope grids, wherein the glass plates work independently to completely block the falling objects. Under high kinetic energy impact of falling objects, the glass plates transfer the impact force to the bottom supporting energy-consuming stiffening slats, and the stiffening slats are stretched to slip relative to the connecting bolts at the long circular holes, which realizes frictional energy consumption and buffer protection of the glass plates.

Figure 7:
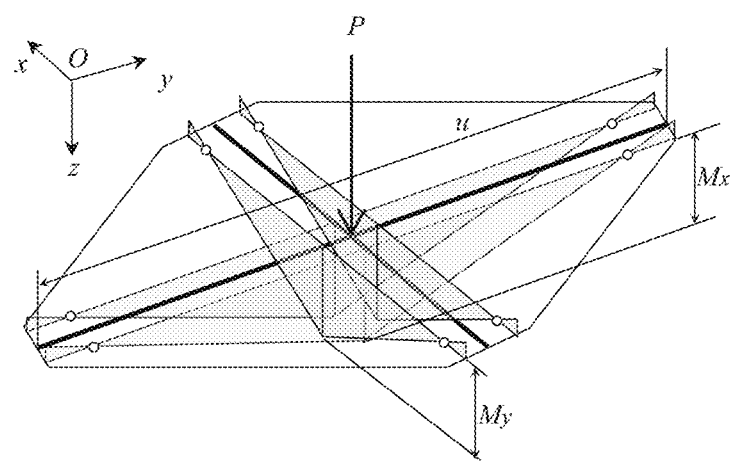
FIG. 7 is a schematic diagram of a bending moment of the glass plate of the flexible glass protective net with landscape function for falling objects according to an embodiment of the present invention.
Figure 8:
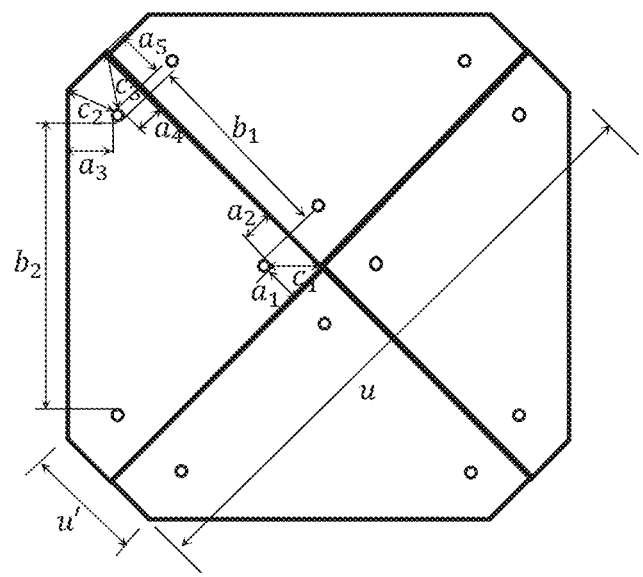
FIG. 8 is a schematic diagram of holes in the glass plate of the flexible glass protective net with landscape function for falling objects according to an embodiment of the present invention.
Figure 9:
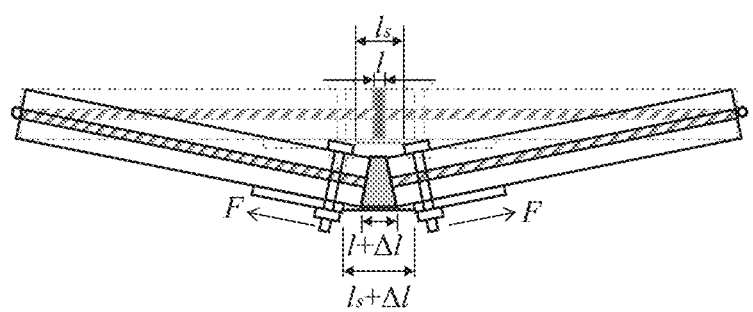
FIG. 9 is a schematic diagram of deformation of the glass plate of the flexible glass protective net with landscape function for falling objects according to an embodiment of the present invention.
Figure 10:
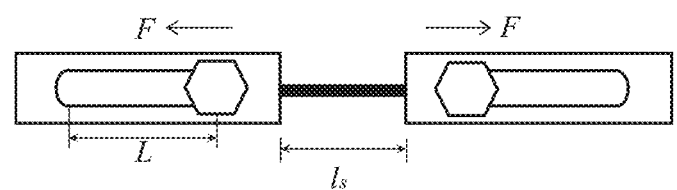
FIG. 10 is a schematic diagram of slippage of stiffening slats of the flexible glass protective net with landscape function for falling objects according to an embodiment of the present invention.

Hereinafter, the design method of the flexible glass net with landscape function for falling objects according to the present invention will be specifically described in conjunction with a common occurrence point of falling objects in a city. The steps are as follows:

Refer to FIGS. 7-10, it is preset that the glass plate is octagonal, the short edge has length of u'=50 mm, and the seam has the length of u=600 mm. The laminated glass is double-layer PVB laminated glass with specification of 12 mm+1.12 mm+12 mm, the glass plate is spliced by four pieces of laminated glass, the hole has diameter of d=12 mm, each piece of the laminated glass is provided with three holes, where $a_1=a_2=60$ mm, $a_4=25$ cm, $c_2=72$ mm. The strength design value of the laminated glass is:

$$f_g = c_1 c_2 c_3 c_4 f_0 = 3 \times 0.8 \times 1 \times 1 \times 28 = 67.2 \text{ N/mm}^2$$

When the system is working, according to the ultimate strength $[\sigma]=0.7$ MPa of the seam rubber strip (8) in the literature, it is assumed that when the seam rubber strip (8) is broken, the laminated glass (6) is not broken. If the impact force is located in the center of the glass plate (4), the maximum bending moment $M_{max}$ borne by the glass plate (4) at the moment is:

$$M_{max} = W[\sigma] = \frac{600 \times 25.12^2 \times 10^{-9}}{6} \times 0.7 \times 10^6 = 44.17 \text{ N} \cdot \text{m}$$

At this time, the maximum tensile stress of the glass plate $$\sigma_{max} = \frac{M_{max}}{W_g} = \frac{44.17 \times 6}{300 \times 25.12^2 \times 10^{-9}} = 1.4 MPa < [f_g]$$

With regard to the hole of the laminated glass, the distance between the edge of the hole and the edge of the glass is:

$$a_1 = a_2 = 600 \text{ mm} > 2t_1$$

$$a_3 = c_2 \cdot \sin\left[\frac{3}{4}\pi - \arccos\left(\frac{0.5 \cdot u' - a_4}{c_2}\right)\right] =$$

$$72 \times \sin\left[\frac{3}{4}\pi - \arccos\left(\frac{0.5 \times 50 - 25}{72}\right)\right] = 50.9 \text{ mm} > 2t_1$$

$$a_4 = 25 \text{ mm} > 2t_1$$

The distance between the edges of two holes is:

$$b_1 = \sqrt{(300-72-60)^2 + (60-25)^2} - d = 159.6 \text{ mm} > 2t_1$$

$$b_2 = 275\sqrt{2} - 72/\sqrt{2} \times 2 = 287.1 \text{ mm} > 2t_1$$

The distance between the edge of the hole and the glass step is:

$$c_1 = \left(a_1 + \frac{d}{2}\right) \times \sqrt{2} - \frac{d}{2} = \left(60 + \frac{12}{2}\right) \times \sqrt{2} - \frac{12}{2} = 87.3 \text{ mm} > 6t_1$$

$$c_2 = 72 \text{ mm} = 6t_1$$

$$c_3 = \sqrt{\left(c_2 + \frac{d}{2}\right)^2 + \left(a_4 + \frac{d}{2}\right)^2} = \sqrt{\left(72 + \frac{12}{2}\right)^2 + \left(25 + \frac{12}{2}\right)^2} = 83.9 \text{ mm} > 6t_1$$

Therefore, the holes of the laminated glass meet the requirements.

The steel wire connecting the stiffening slats has the length of $l_s$=160 mm, the diameter of $d_s$=3 mm, and the ultimate strength of [f]=1770 MPa; the gravity load of the laminated glass per unit area is designed to be $q_G$=0.614 kN/m², the single glass plate has the area of A=52650 mm², the glass edge connected with the seam rubber strip has the length of s=600 mm, and the length $f_2$ and width l of the rubber strip under permanent load satisfy:

$$l = \frac{q_G A}{2000 s f_2} = \frac{0.614 \times 52650 \times 10^{-6}}{2000 \times 600 \times 10^{-3} \times 0.01} = 2.6 \times 10^{-3} \text{ m}$$

The ultimate strain ε of the seam rubber strip is 0.5, the seam rubber strip (8) deforms under the impact, and its deformation amount is:

$$\Delta l = \varepsilon \cdot l = 0.5 \times 0.0026 = 0.0013 \text{ m}$$

The seam rubber strip is broken under force, and the stiffening slat is started under force. At this time, the internal force F of the steel wire connecting the stiffening slats is:

$$F = \frac{\Delta l}{l_s} E_s A_s = \frac{0.0013}{0.16} \times 2.06 \times 10^{11} \times \frac{\pi}{4} \times 0.003^2 =$$

$$11.8 \text{ kN} < 1770 \times 10^6 \times \frac{\pi}{4} \times 0.003^2 = 12.5 \text{ kN}$$

The friction coefficient μ is 0.8, and the pre-tightening force N of the bolt is:

$$N > \frac{F}{2\mu} = \frac{11.8}{2 \times 0.8} = 7.4 \text{ kN}$$

The pre-tightening force N of the bolt is 8 kN. Therefore, the energy consumption starting force of the stiffening slat is:

$$F_d = 2\mu N = 2 \times 0.8 \times 8 = 12.8 \text{ kN}$$

The energy consumption capacity of the stiffening slat is preset to E=1 kJ, and the length L of the long circular hole of the stiffening slat is:

$$L = \frac{E}{F_d} = \frac{1}{12.8} = 0.08 \text{ m}$$

The fixing mode and the connection mode are the prior art and will not be described in detail here.

Finally, it should be noted that the above embodiments are only for explaining, but not limiting, the technical solutions of the present invention; although the present invention has been described in detail with reference to the foregoing embodiments, those of ordinary skill in the art should understood that the technical solutions described in the foregoing embodiments may be modified, or some of the technical features may be equivalently substituted; and such modifications or substitutions do not make the essence of the corresponding technical solutions depart from the spirit and scope of the technical solutions of the present invention.

The invention claimed is:

1. A flexible glass protective net with landscape function for falling objects, comprising flexible support ropes, buckling clamps, articulated pieces, glass plates and seam rubber strips; wherein
    the flexible support ropes are arranged crosswise in a grid shape, the buckling clamps are arranged at grid nodes, and the glass plates are arranged in grids;
    the glass plates comprise pieces of glass, and the pieces of glass are connected by the seam rubber strips at seams;
    the pieces of glass are clamped and fixed by the articulated pieces, a tail end of the articulated piece is connected to the buckling clamp, and the glass plates are connected to the buckling clamps via the articulated pieces;
    slots reserved in the buckling clamps are mutually crossing and separated, and
    the flexible support ropes at the grid nodes respectively pass through the slots.

2. The flexible glass protective net according to claim 1, further comprising stiffening slats, wherein
    the stiffening slats are arranged at the seams of the pieces of glass and located on the bottom surface of the glass plates,
    the stiffening slats are provided with a long circular bolt hole and connected to the glass plates by a first pre-tightening bolt, and
    the stiffening slats at opposite positions are connected by a steel wire or a spring.

3. The flexible glass protective net according to claim 2, wherein
    the stiffening slats are energy-consuming stiffening slats.

4. The flexible glass protective net according to claim 2, wherein the glass plates are tempered glass, and the glass plates are rhombic and are spliced by four pieces of the laminated glass.

5. The flexible glass protective net according to claim 1, wherein
the buckling clamps comprise a clamping plate and second pre-tightening bolts;
the slots are reserved in the clamping plate,
edges of the clamping plate are provided with reserved holes, and
the articulated pieces are connected to the reserved holes by bolts.

6. The flexible glass protective net according to claim 5, wherein further comprising stiffening slats,
the stiffening slats are arranged at the seams of the pieces of glass and located on the bottom surface of the glass plates,
the stiffening slats are provided with a long circular bolt hole and connected to the glass plates by a first pre-tightening bolt, and
the stiffening slats at opposite positions are connected by a steel wire or a spring.

7. The flexible glass protective net according to claim 1, further comprising rubber pads, wherein
the rubber pads are arranged at joints between the articulated pieces and the glass plates.

8. The flexible glass protective net according to claim 7, wherein the buckling clamps comprise a clamping plate and second pre-tightening bolts;
the slots are reserved in the clamping plate,
edges of the clamping plate are provided with reserved holes, and
the articulated pieces are connected to the reserved holes by bolts.

9. The flexible glass protective net according to claim 1, wherein
the glass plates comprise pieces of tempered glass, and
the glass plates are rhombic and are spliced by four pieces of glass.

* * * * *